United States Patent

[11] 3,617,137

| [72] | Inventor | Siegfried S. Meyers<br>Harrisonburg, Va. |
|---|---|---|
| [21] | Appl. No. | 825,286 |
| [22] | Filed | May 16, 1969 |
| [45] | Patented | Nov. 2, 1971 |
| [73] | Assignee | Madison College Foundation, Inc.<br>Harrisonburg, Va. |

[54] LUMEN-HOUR INTEGRATION METERS
4 Claims, 1 Drawing Fig.

| [52] | U.S. Cl. | 356/215,<br>324/111 |
|---|---|---|
| [51] | Int. Cl. | G01j 1/46 |
| [50] | Field of Search | 356/215;<br>324/111 |

[56] References Cited
UNITED STATES PATENTS

| 2,225,353 | 12/1940 | Scheldorf | 356/215 |
| 2,286,036 | 6/1942 | Lamb | 356/215 |
| 2,386,320 | 10/1945 | Kott | 356/215 X |
| 2,567,276 | 9/1951 | Dicke | 324/111 X |
| 2,713,135 | 7/1955 | Macklem | 324/111 UX |

*Primary Examiner*—Ronald L. Wibert
*Assistant Examiner*—Warren A. Sklar
*Attorney*—Mason, Fenwick and Lawrence ABSTRACT: A lumen-hour integration meter circuit for registering intensity of illumination in lumens, which includes a miniature direct current motor, a zero-adjusting rheostat, and either self-generating photovoltaic solar cell means or a switch and photoconductive cell, all connected in a series loop, together with a digital readout counter coupled to the motor to be driven by the motor, whereby the counter will register in units of lumen hours.

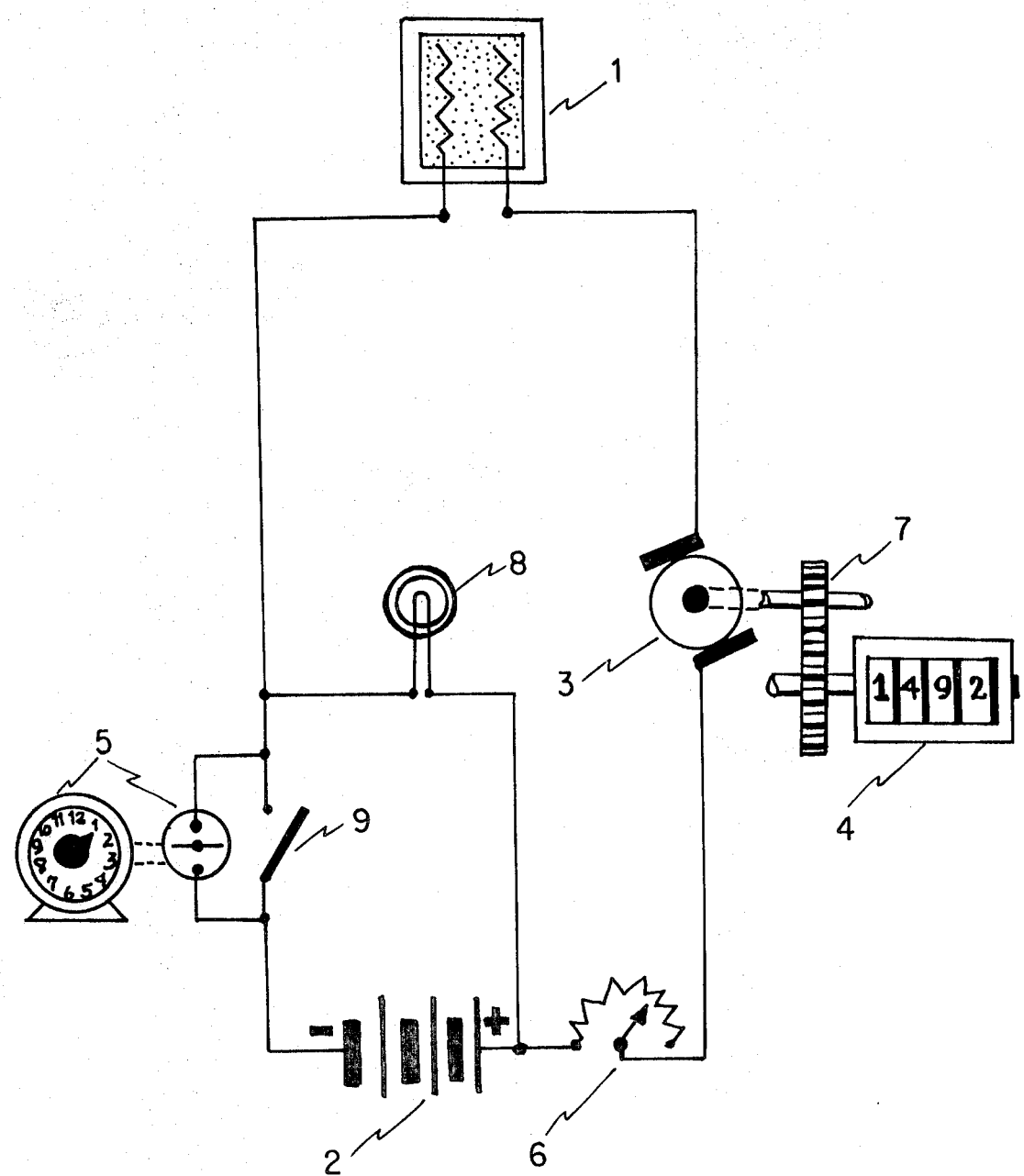

LUMEN-HOUR INTEGRATION METERS

The present invention relates to a direct-readout instrument for integrating the total amount of daylight energy measured in lumen-hour units falling upon any surface. This Lumen-hour Integration Meter continuously registers its units on a digital readout counter in proportion to the intensity of illumination in lumens falling upon a photoconduction cell as said intensity varies with changing cloudiness, air pollution from smoke and dust, or even during a solar eclipse, or changing position of the sun.

The basic principle employed in totaling electrical energy consumption involves a motor-driven continuous registration of electrical power consumption in watts multiplied by the elapsed time. Similarly, this Lumen-hour Integration Meter, to be described below, continuously registers the product of the intensity of illumination in lumens, or an equivalent unit, by the total elapsed time of light exposure.

I hereby declare the following to be a full, clear, and exact description of this invention, such as will enable others skilled in the art to which it pertains to make and use the same, reference being had to the accompanying drawing, which forms a part of this specification. It is further declared that other electrical and mechanical configurations are contemplated with variations in the arrangement of the components, such as: the use of a directly driven motor-counter assembly from a bank of silicon solar cells to eliminate the need for a separate direct current power source in order to achieve the same end-result of integrating total light energy with a direct-readout counter without departing from the spirit of this invention.

My invention relates to this direct-readout Light-energy Integration Meter and consists in the structure, arrangements, and combinations hereinafter described and claimed. It is further contemplated that other energy units may likewise be integrated, such as sound, heat, gamma radiation, X-ray radiation, humidity, etc. by using suitable input sensors.

The single figure of the drawing is a schematic circuit diagram showing a light-sensitive photoconduction cell 1, which consists of cadmium sulfide, or selenium, or any other photoconductor, connected in series with a low-voltage direct current source 2; and a miniature direct current motor 3; said motor being reduction-geared to a mechanical digital readout counter 4; and wired to an optional time clock and switch either manually wound or electrically operated 5. Since the light-sensitive photoconduction cell has an inherently high ohmic resistance of the order of megohms in total darkness, said resistance decreases to lower values as the intensity of illumination increases. A critical level of light intensity, such as at sunrise, reduces the resistance of the photoconductor so that the electric motor's starting current may flow, as predetermined by the setting of the zero-adjusting variable resistor 6, which, in turn drives the direct-readout counter gears 7.

The time clock and switch may be optionally omitted when the device is to operate as self-starting and self-stopping between the precise moments of sunrise and sunset which are known from established tables or from daily weather reports.

The clock may be included as a convenience when needed to register the total lumen-hours of light exposure between any 2 particular hours of the day. A pilot-light 8 is connected in parallel with the electric power source whenever the manual on-off switch 9 is turned on.

The ultimate advantage to be derived from this invention is provision for direct readout of daily total light energy units, regardless of the periodic variations of the sun's light intensity which naturally varies during an ordinary day. This invention eliminates the need for using cumbersome and costly continuously running strip-chart recorders which require considerable study and time to analyze the same end-result. For studies of the effects of solar radiation upon crops; the effects upon the discoloration of outdoor paints; the fading of dye colors; and any other product-exposures to daylight, the Lumen-hour Meter, with other light-sensitive elements employing suitable envelopes and filters, provides for direct-readout units of total light energy.

Having thus described my invention what I desire to claim is:

1. A lumen-hour integration meter circuit for continuously registering intensity of illumination in lumens, comprising a photoconduction light-sensitive cell, circuit means for connecting said cell in a series loop with a direct current voltage source, a miniature direct current motor, a switch for said circuit movable between open and closed positions, and a zero-adjusting rheostat; a digital readout counter coupled to said motor to be driven thereby, said zero-adjusting rheostat being connected in series circuit relation with said cell and motor and switch for adjusting the electrical resistance of the circuit so that the intercoupled motor and readout counter will register in units of lumen-hours when calibrated against standard incident units of light intensity in lumens multiplied by the elapsed time in hours following closure of the switch.

2. A lumen-hour integration meter circuit as defined in claim 1, wherein said cell has a high ohmic resistance in total darkness coactive with the zero-adjusting rheostat to prevent flow of current of sufficient level to start the motor until a selected level of light intensity occurs.

3. A lumen-hour integration meter circuit as defined in claim 1, including a time clock coupled to said switch to close and open the switch and thereby start and stop operation of the meter circuit at predetermined times.

4. A lumen-hour integration meter circuit for continuously registering intensity of illumination in lumens, comprising a series loop circuit including a miniature direct current motor, circuit means for supplying direct current to said motor to drive the motor when the light intensity monitored by the circuit exceeds a selected level including self-generating photovoltaic solar cell means responsive to light energy for generating electrical current to drive said motor, and a zero-adjusting rheostat; a digital readout counter coupled to the motor to be driven by the motor, said zero-adjusting rheostat adjusting the electrical resistance of the series loop circuit to produce operation of the motor responsive to incident light energy providing direct readout in lumen-hours of total light energy during selected time intervals.

* * * * *